United States Patent
Scholz

(10) Patent No.: US 10,731,668 B2
(45) Date of Patent: Aug. 4, 2020

(54) RETAINER ARRANGEMENT FOR THE MOUNTING OF A FAN ON A LIGHT MODULE OF A HEADLAMP FOR A VEHICLE

(71) Applicant: Hella GmbH & Co. KGaA, Lippstadt (DE)

(72) Inventor: Sebastian Scholz, Soest (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 163 days.

(21) Appl. No.: 15/980,872

(22) Filed: May 16, 2018

(65) Prior Publication Data

US 2018/0335054 A1    Nov. 22, 2018

(30) Foreign Application Priority Data

May 17, 2017    (DE) .................. 10 2017 110 740

(51) Int. Cl.

| | |
|---|---|
| F04D 29/64 | (2006.01) |
| F04D 29/52 | (2006.01) |
| B60Q 1/00 | (2006.01) |
| F04D 29/60 | (2006.01) |
| F21S 45/43 | (2018.01) |
| F21S 45/49 | (2018.01) |

(52) U.S. Cl.
CPC ............ F04D 29/646 (2013.01); B60Q 1/00 (2013.01); F04D 29/522 (2013.01); F04D 29/601 (2013.01); F21S 45/43 (2018.01); F21S 45/49 (2018.01); *B60Q 1/0064* (2013.01)

(58) Field of Classification Search
CPC .... F04D 29/522; F04D 29/601; F04D 29/646; B60Q 1/00; B60Q 1/0064; F21S 45/43; F21S 45/49
See application file for complete search history.

(56) References Cited

U.S. PATENT DOCUMENTS

| | | | | |
|---|---|---|---|---|
| 2,810,514 | A * | 10/1957 | Patrick | ................. F04D 29/626 415/213.1 |
| 5,344,287 | A * | 9/1994 | Schaefer | ............... F04D 29/601 415/213.1 |
| 6,227,686 | B1 * | 5/2001 | Takahashi | ............... F21V 25/02 362/345 |
| 6,257,012 | B1 * | 7/2001 | Tesche | ............... F04D 29/4226 415/204 |
| 6,375,440 | B2 * | 4/2002 | Kosugi | ................ F04D 25/166 165/80.3 |

(Continued)

FOREIGN PATENT DOCUMENTS

| | | |
|---|---|---|
| DE | 102013017022 A1 | 4/2015 |
| EP | 2327928 A1 | 6/2011 |
| EP | 2679883 A2 | 1/2014 |

*Primary Examiner* — Igor Kershteyn
(74) *Attorney, Agent, or Firm* — Husch Blackwell LLP

(57) ABSTRACT

A retainer arrangement for the support of a fan on a light module of a headlamp for a vehicle as well as a fan holder for the generation of such a retainer arrangement. The fan is fastened in a detachable manner to the fan holder. The fan holder has a hinged locking element that can be moved into an open position. The fan can be installed in the fan holder and removed from the fan holder, and can be moved in a locked position, in which the fan is firmly fastened to the fan holder.

8 Claims, 2 Drawing Sheets

(56) References Cited

U.S. PATENT DOCUMENTS

| | | | | |
|---|---|---|---|---|
| 6,961,248 B2* | 11/2005 | Vincent | .............. | H05K 7/20172 |
| | | | | 361/679.46 |
| 7,048,498 B2* | 5/2006 | Kosugi | ................ | F04D 29/703 |
| | | | | 415/118 |
| 7,311,492 B2* | 12/2007 | Ostberg | .............. | F04D 29/4226 |
| | | | | 415/126 |
| 8,631,665 B1* | 1/2014 | DeClementi | .............. | F25D 7/00 |
| | | | | 415/213.1 |
| 2009/0195159 A1* | 8/2009 | Smith | .................... | F21V 25/04 |
| | | | | 315/33 |

* cited by examiner

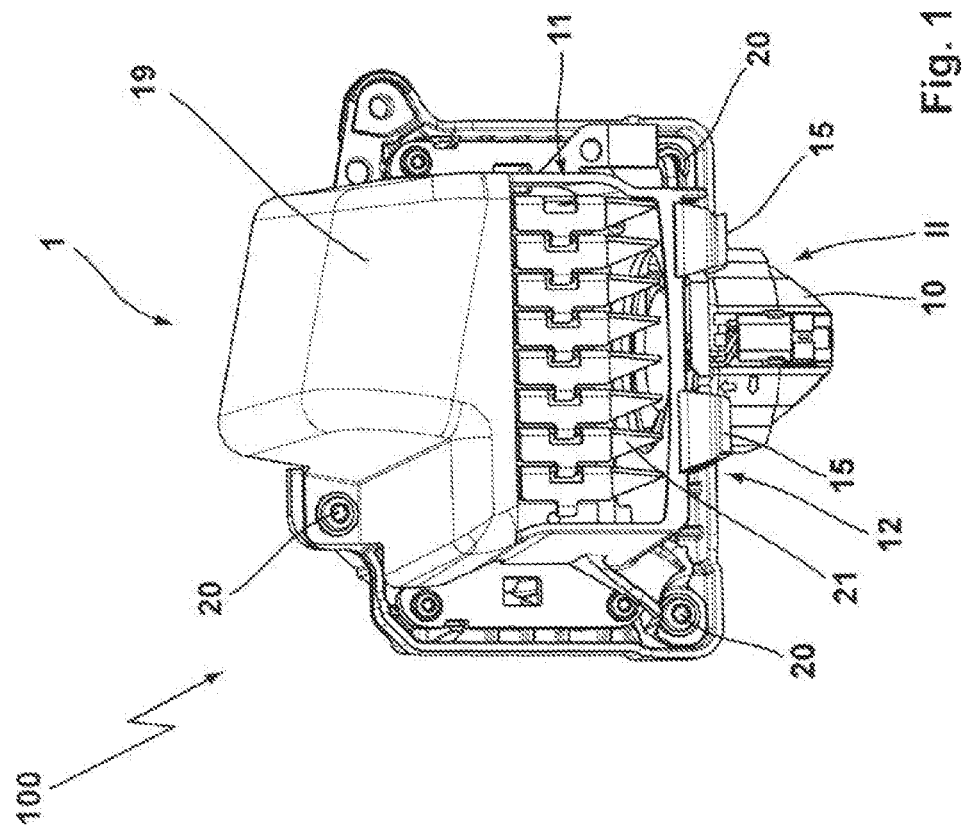

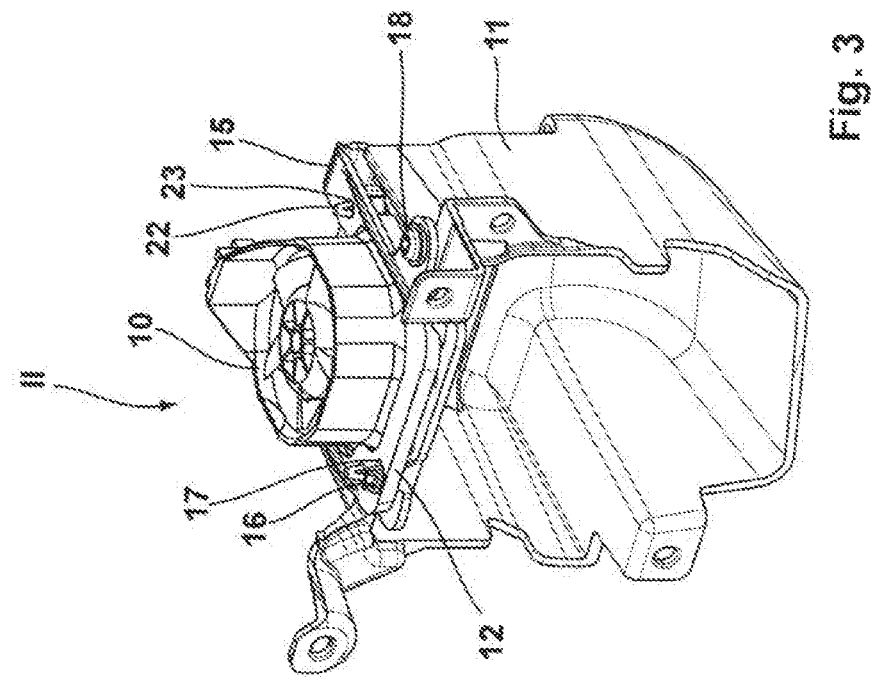
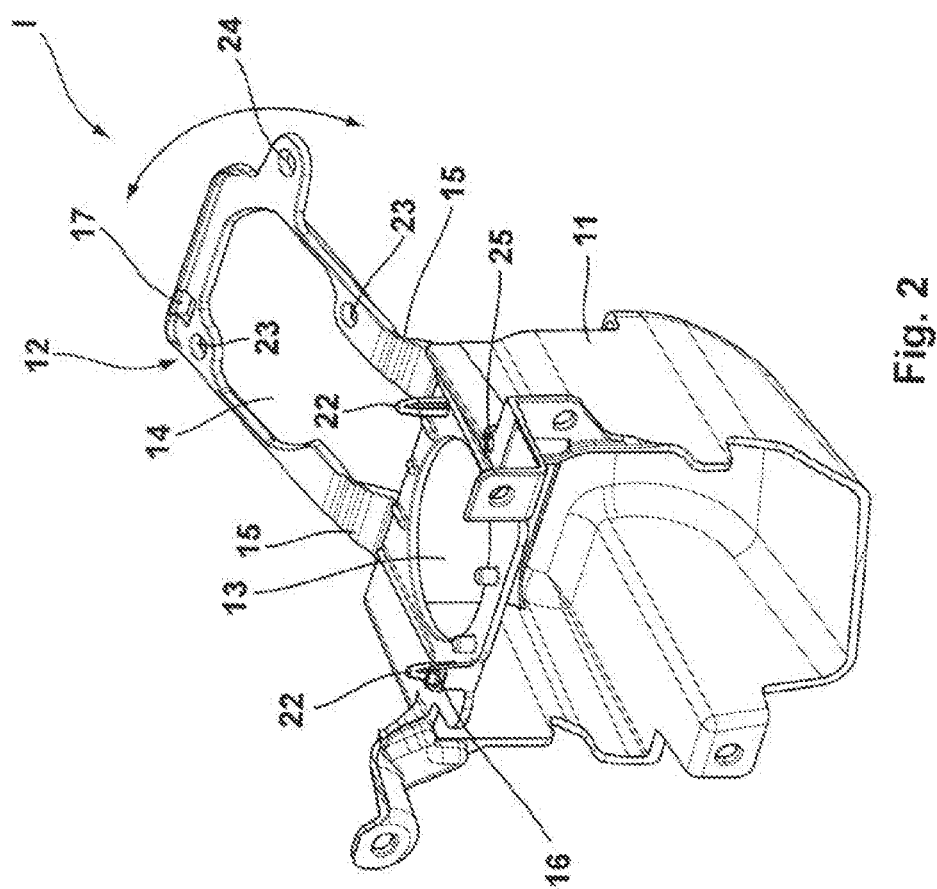

RETAINER ARRANGEMENT FOR THE MOUNTING OF A FAN ON A LIGHT MODULE OF A HEADLAMP FOR A VEHICLE

CROSS REFERENCE

This application claims priority to German Patent Application 10 2017 110740.1, filed 17 May 2017, the entirety of which is hereby incorporated by reference.

FIELD OF THE INVENTION

The present invention relates to a retainer arrangement for the installation of a fan on a light module of a headlamp for a vehicle, comprising a fan holder to which the fan is fastened in a detachable manner.

BACKGROUND

From the DE 10 2013 017 022 A1, a retainer arrangement for the installation of a fan on a light module of a headlamp for a vehicle is known. The retainer arrangement comprises a fan holder to which the fan is fastened in a detachable manner. The fan holder has an air duct area to guide an air stream generated by the fan over a heatsink. The fan seat has a pocket to receive the fan in a formfitting manner. Fastening means for the retention of the fan are provided in the shape of detent hooks, so that the fan cannot move out of the pocket accidentally.

To replace the fan, it needs to be moved out of the pocket at right angles to the fan axis, which is difficult to realize in view of the limited installation space of a light module in the housing of a headlamp. It is, in particular, not possible to move the detent hooks back through the rear service opening in the headlamp housing without removing the light module from the housing of the headlamp in order to take the fan from the pocket in the fan holder.

The EP 2 679 883 A2 discloses a retainer arrangement for the installation of a fan on a light module of a headlamp for a vehicle. The fan can be snap-fastened to the fan holder or be connected by means of a bayonet coupling. The bayonet coupling requires the rotation of the fan on the fan holder, which necessitates securing means to prevent the accidental loosening of the fan from the fan holder due to a rotation in the opening direction of the bajonet coupling. This results in a complex design of the fastening of the fan to the fan holder. Here, too, the fan is not readily accessible for replacement through a service opening in the headlamp housing.

SUMMARY OF THE INVENTION

It is the task of the invention to further develop a retainer arrangement for the support of a fan on a light module of a headlamp and to provide an improved fan holder for such a retainer arrangement, wherein the retainer arrangement should be kept as simple as possible. In particular, it should be easy to remove the fan from the fan holder, e.g. through a service opening in the housing of the headlamp.

I To solve the task preceding the invention, a retainer arrangement is proposed, in which the fan holder has a hinged locking element which can be opened into an open position in which the fan can be installed in the fan holder and removed from the fan holder, and which can be folded into a locked position in which the fan is firmly fastened to the fan holder.

I Herein the locking element is executed so that in the locked position, it connects the fan firmly with the fan holder, so that the fan cannot be released from the fan holder even by oscillation or vibrations. The fan is received in a form-locking manner particularly by the locking element on the fan holder when the locking element is folded into the locked position. A further advantage of the foldable locking element is that the locking element can be moved between the open position and the locked position through a service opening in the housing of the headlamp; in particular in cases where, e.g. in the open position, the locking element protrudes e.g. partially into the service opening or even protrudes from the service opening toward the outside. The service opening in the headlamp housing provides—without further design measures—the required space for the folding movement of the locking element, and in the open position, the fan can be easily removed from the fan holder. If the locking element is returned into the locked position, it can be manually snap-fastened to the fan holder in an easy manner.

I For an advantageous arrangement of the fan on the fan holder, the fan holder has an opening for the fan over which the fan can be arranged, while the locking element furthermore has a retainer opening into which the fan protrudes at least partially when the locking element is folded into the locked position for a fastening support of the fan in the locked position. Herein it is particularly advantageous, if the opening for the fan and the retainer opening are embodied in an overlapping manner when the locking element is folded into the locked position. Advantageously, the fan has a flange situated between the locking element and the edge of the opening for the fan when the fan is arranged on the fan holder, and when the locking element is folded into the locked position. Thus, the flange of the fan is arranged between the basic body of the fan holder and the locking element, so that the fan is, in a certain manner, clamped between the locking element and the fan holder. The fan can protrude into the retainer opening in the locking element with a cylindrical section, and with its flange it can rest against the inside of the locking element. Thus, the fan rests on the fan holder in a form-locking manner in all directions and as long as the locking element is in the locked position, the loss-proof, retaining arrangement of the fan on the fan holder is ensured.

I A particular advantage is achieved when the locking element is made from the same material as the fan holder. The fan holder and therefore also the locking element are advantageously made from a plastic material. In a particularly advantageous embodiment, the fan holder and the locking element are made in a common injection-molding process. Herein, the locking element is in particular arranged in a foldable manner on the fan holder by means of a film hinge.

With a further advantage, a snap-on connection having a detent hook and a complementary snap-fastening geometry is embodied between the locking element and the fan holder. By means of this, the locking element is arrangeable on the fan holder in the locked position in a self-supporting manner. In other words, the locking element can be snap-fastened to the fan holder in the locked position, wherein the detent hook is particularly arranged at the longest distance possible with regard to the film hinge for a connection of the locking element with the fan holder. Herein, it is possible to form the detent hook onto the fan holder and to provide the complementing snap-fastening geometry on the locking element. It is, however, also possible to form the detent hook onto the locking element and the complementary snap-fastening geometry on the fan holder.

Furthermore, it is advantageous if the locking element on the fan holder is secured by means of a screw element when the locking element is folded into the locked position. To this end, the locking element has at least one screw opening, which, in the closed position of the locking element, overlaps a screw-bore in the fan holder, so that the screw element can be inserted in the screw opening and screw-fastened in the screw bore to secure the locking element on the fan holder. Such an arrangement of a screw element can also be provided several times to secure the locking element on the fan holder.

According to a further advantageous embodiment of the fan holder, it has an air guiding area. A heatsink of the light module can be arranged inside the air guiding area, when the fan holder is fastened to the light module.

The fan holder is for example screw-fastened to the light module by means of screw elements. Alternatively, the fan holder can be snap-fastened to the light module or fastened by means of a bayonet lock.

In another advantageous embodiment, a boss arrangement comprising a boss and an opening for the boss is embodied between the locking element and the fan holder, whereby the locking element and particularly the fan can be positioned on the fan holder. The particular advantage is that the fan can be arranged on the fan holder in that the bosses extend through the openings in the flange of the fan so that the fan can be arranged on the fan holder in a prepositioned manner before folding the locking element in the locked position. In addition, the boss arrangement aids in arranging the locking element in the required position, i.e. in the locked position, on the fan holder as the film hinge does not have any particular guiding effect. The positioned alignment of the locking element on the fan holder in the locked position is important for the effective snap-fastening of the detent hook in the complementary snap-fastening geometry holding the locking element in the locked position on the fan holder even without screw-fastening.

Furthermore, the invention relates to a fan holder for the creation of a retainer arrangement for the retention of a fan on a light module of a headlamp for a vehicle, wherein the fan holder has a foldable locking element which can be folded into an opened position, in which the fan can be inserted in and removed from the fan holder, and which can be folded into a locked position, in which the fan is firmly arranged on the fan holder. Further characteristics and assigned advantages listed in connection with the retainer arrangement apply to the fan holder according to the invention accordingly.

BRIEF DESCRIPTION OF THE DRAWINGS

Reference is now made more particularly to the drawings, which illustrate the best presently known mode of carrying out the invention and wherein similar reference characters indicate the same parts throughout the views.

FIG. 1 is a perspective view of a light module with a retainer arrangement for the support of a fan according to the invention.

FIG. 2 is a perspective view of the fan holder with a locking element in an opened position.

FIG. 3 illustrates the fan holder according to FIG. 2 with a fan in place, wherein the locking element is now in a locked position.

DETAILED DESCRIPTION OF THE DRAWINGS

FIG. 1 shows a perspective view of a light module 100 with a retainer arrangement 1 for the support of a fan 10 in the light module 100, wherein the light module 100 is embodied for the installation in a headlamp for a vehicle. A fan holder 11 being fastened to the light module 100 by means of screw elements 20 serves the holding of the fan 10.

The fan holder 11 is embodied in a hood-shaped manner and has an air duct area 19 enclosing a heatsink 21 of the light module 100 at least partially in a hood-like manner. When the fan 10 is activated, it generates an air stream serving the heat-dissipation of the heatsink 21. The fan 10 is held on the fan holder 11 by means of a locking element 12 not visible in FIG. 1. The locking element 12 is connected to the fan holder 11 by means of film hinges 15, the locking element 12 being in a locked position II in the variant shown in FIG. 1.

FIG. 2 shows a perspective view of the fan holder 11 with a locking element 12 in the open position I. The representation shows the connection of the locking element 12 to the fan holder 11 by means of film hinges 15, by means of which the locking element 12 can be folded on the fan holder 11, as indicated by a double-pointed arrow. The fan holder has an opening for the fan 13, which can be overlapped by a retainer opening 14 in the locking element 12 in a locked position. When the locking element 12 is moved into the locked position, bosses 22 on the fan holder 11 protrude into openings for the bosses 23 in the locking element 12, and a detent hook 16 on the fan holder 11 can snap-fasten in a complementary snap-fastening geometry 17 in the locking element 12. To secure the locking element 12 additionally in the locked position, the locking element 12 has a screw opening 24, wherein a belonging screw bore 25 is embodied on the fan holder 11, so that a screw element can be used.

FIG. 3 shows the fan holder 11 with a locking element 12 in a locked position II, wherein a fan 10 is arranged on the fan holder 11 in a loss-proof and firm arrangement. To this end, the detent hook 16 is snap-fastened to the complementary snap-fastening geometry 17. Additionally, a screw element 18 is screwed into the screw opening to secure the locking element 12 on the fan holder 11. The bosses 22 are, furthermore, guided through the boss openings 23. On the back, the locking element 12 is held on the fan holder 11 by the film hinges 15.

The embodiment of the invention is not limited to the preferred embodiment described above. Furthermore, a number of variants are conceivable, which use the presented solution also in fundamentally different executions. All characteristics and/or advantages arising from the claims, the description, or the drawings, including design details, spacial arrangements and process steps, can be essential for the invention, either on their own or in the most varied combinations.

LIST OF REFERENCE SIGNS

1 Retainer arrangement
10 Fan
11 Fan holder
12 Locking element
13 Opening for the fan
14 Retainer opening
15 Film hinge
16 Detent hook
17 Complementary snap-fastening geometry
18 Screw element 19 Air duct area
20 Screw element
21 Heatsink
22 Boss
23 Boss opening
24 Screw opening
25 Screw bore
100 Light module
I Open position
II Locked position

The invention claimed is:

1. A retainer arrangement for supporting a fan on a light module of a headlamp for a vehicle, the retainer comprising:
 a fan holder to which the fan is fastened in a detachable manner, the fan holder including:
  a hinged locking element moveable between an open position in which the fan is selectively installable into and removable from the fan holder, and a locked position in which the fan is firmly fastened to the fan holder; and
  wherein the fan holder has an opening for the fan above which the fan is positionable, and wherein the locking element has a retainer opening into which the fan protrudes partially when the locking element is folded into the locked position.

2. The retainer arrangement according to claim 1, wherein the opening for the fan and the retainer opening are embodied in an overlapping manner when the locking element is folded into the locked position.

3. The retainer arrangement according to claim 1, wherein the locking element is made from the same material as the fan holder.

4. The retainer arrangement according to claim 1, wherein the locking element is arranged on the fan holder in a hinged manner by means of a film hinge.

5. The retainer arrangement according to claim 1, wherein a snap-on connection having a detent hook and a complementary snap-fastening geometry are embodied between the locking element and the fan holder by means of which the locking element is arrangeable on the fan holder in the locked position in a self-supporting manner.

6. The retainer arrangement according to claim 1, wherein the fan holder has an air duct area.

7. The retainer arrangement according to claim 1, wherein between the locking element and the fan holder, there is at least one boss arrangement comprising a boss and an opening for the boss embodied, whereby the fan can be positioned on the fan holder.

8. A retainer arrangement for supporting a fan on a light module of a headlamp for a vehicle, the retainer comprising:
 a fan holder to which the fan is fastened in a detachable manner, the fan holder including:
  a hinged locking element moveable between an open position in which the fan is selectively installable into and removable from the fan holder, and a locked position in which the fan is firmly fastened to the fan holder; and
 wherein the locking element on the fan holder is secured by means of a screw element when the locking element is folded into the locked position.

* * * * *